(12) United States Patent
Walker

(10) Patent No.: US 6,631,773 B1
(45) Date of Patent: Oct. 14, 2003

(54) ARTICULATED TRUCK FOR CARRYING A LOAD THROUGH A PLURALITY OF WORK CYCLES

(75) Inventor: Richard D. Walker, Dalton City, IL (US)

(73) Assignee: Caterpillar S.A.R.L., Geneva ( * ) Notice: Subject to any disclaimer, the term of this patent is extended or adjusted under 35 U.S.C. 154(b) by 0 days.

(21) Appl. No.: 09/844,149

(22) Filed: Apr. 27, 2001

Related U.S. Application Data

(60) Provisional application No. 60/215,968, filed on Jul. 5, 2000.

(51) Int. Cl.[7] .............................................. B62D 61/10
(52) U.S. Cl. ................ 180/24.09; 180/14.4; 180/24.04; 180/235; 180/249; 280/400
(58) Field of Search .............................. 180/14.1, 14.4, 180/24.02, 24.04, 24.08, 24.09, 235, 248, 249, 250, 312, 418, 419, 420; 280/400, 492

(56) References Cited

U.S. PATENT DOCUMENTS

| | | | | | |
|---|---|---|---|---|---|
| 902,149 | A | * | 10/1908 | Hansen ........................ | 180/248 |
| 1,957,917 | A | * | 5/1934 | Storey ......................... | 180/235 |
| 2,344,388 | A | * | 3/1944 | Bixby ........................ | 180/24.08 |
| 2,625,231 | A | * | 1/1953 | Martin ......................... | 180/266 |
| 2,766,637 | A | * | 10/1956 | Bock .......................... | 74/368 |
| 2,884,083 | A | * | 4/1959 | McColl ....................... | 180/12 |
| 3,083,782 | A | * | 4/1963 | Ivaldi ........................ | 180/24.04 |
| 3,211,498 | A | * | 10/1965 | Peller ........................ | 180/235 |
| 3,351,037 | A | * | 11/1967 | Meili ....................... | 440/12.66 |
| 3,434,739 | A | * | 3/1969 | Schoonover ................. | 180/23 |
| 3,446,175 | A | * | 5/1969 | Boehler et al. ............... | 180/12 |
| 3,454,123 | A | * | 7/1969 | Lewis ........................ | 180/14.4 |
| 3,521,720 | A | * | 7/1970 | Korotkin .................... | 180/265 |
| 3,556,238 | A | * | 1/1971 | Figura ....................... | 180/235 |
| 3,568,788 | A | * | 3/1971 | Mayeaux ..................... | 180/235 |
| 3,630,302 | A | * | 12/1971 | Holland, Sr. ................ | 180/14.1 |
| 3,701,393 | A | * | 10/1972 | Lemons et al. .............. | 180/235 |
| 5,417,297 | A | * | 5/1995 | Auer ........................ | 180/24.11 |
| 5,568,841 | A | * | 10/1996 | Weissbach ................... | 180/311 |
| 5,950,750 | A | * | 9/1999 | Dong et al. ............... | 180/24.08 |
| 6,085,853 | A | * | 7/2000 | Wernick ................... | 180/24.09 |
| 6,206,118 | B1 | * | 3/2001 | Menze et al. .............. | 180/14.1 |

FOREIGN PATENT DOCUMENTS

| | | | | | |
|---|---|---|---|---|---|
| CA | 728986 | | * | 3/1966 | .................. 180/235 |
| EP | 0250957 | | * | 1/1988 | .............. 180/24.08 |
| GB | 1068611 | | * | 5/1967 | .................. 180/235 |
| JP | 0167261 | | * | 10/1983 | .................. 180/235 |

OTHER PUBLICATIONS

Caterpillar Inc., "D400E Series II Articulated Trucks," showing prior art articulated truck.
One page color excerpt from Caterpillar Inc. articulated truck brochure, annotated for purposes of Information Disclosure Statement.
Caterpillar Inc. drawing No. 138–7952.
Excerpt from Caterpillar Inc. drawing No. 138–8900.

* cited by examiner

*Primary Examiner*—Lesley D. Morris
*Assistant Examiner*—Daniel Yeagley
(74) *Attorney, Agent, or Firm*—John J Cheek; Finnegan, Henderson, Farabow, Garrett & Dunner

(57) ABSTRACT

An articulated truck for carrying a load through a plurality of work cycles is disclosed. An embodiment includes a frame assembly, an articulation. joint, a plurality of axles, a plurality of ground engaging devices, an operator compartment, a body, an engine, a transmission and an apparatus for receiving the torque and transferring the torque to a plurality of drive shafts. The apparatus includes a plurality of gears, an inter-axle differential, and a plurality of drive shafts. The inter-axle differential is located such that the front axle may be suspended to allow oscillation.

19 Claims, 3 Drawing Sheets

ARTICULATED TRUCK FOR CARRYING A LOAD THROUGH A PLURALITY OF WORK CYCLES

This application claims the benefit of prior provisional patent application No. 60/215,968, filed Jul. 5, 2000.

TECHNICAL FIELD

This invention relates generally to an articulated truck for carrying a load through a plurality of work cycles and, more particularly, to an articulated truck including an apparatus for receiving torque and transferring the torque to a plurality of drive shafts.

BACKGROUND

Articulated trucks are often used for transporting a loose load, for example, soil, rocks, gravel, garbage and the like from one location to another. Often, the path over which the articulated dump truck must travel may vary in stability, composition, terrain and grade. These work machines are typically configured to perform various work cycles.

As an articulated truck performs work cycles, the truck must often turn and traverse diverse terrain. For example, carrying a load across a narrow winding dirt or rock road. In such instances, many articulated dump trucks suffer from a rough ride or may even experience compromised stability if the truck is not loaded properly. The rough ride could distract an inexperienced operator, or if maintained for a prolonged time, could contribute to fatigue.

Accordingly, the art has sought an articulated truck for carrying a load through a plurality of work cycles which: improves space. utilization within the chassis of the articulated truck; improves stability of the articulated truck 100 by allowing for a higher mounted articulation joint 110; provides room for an oscillated suspended front axle 220; significantly improves the suspension and ride experienced by the operator of the articulated truck 100; and is more economical to manufacture and use.

The present invention is directed to overcoming one or more of the problems as set forth above.

SUMMARY OF THE INVENTION

In an embodiment of the present invention an articulated truck for carrying a load through a plurality of work cycles is provided. The articulated truck includes a frame assembly, an articulation joint, a plurality of axles, a plurality of ground engaging devices, an operator compartment, a body, an engine, a transmission and an apparatus for receiving the torque and transferring the torque to a plurality of drive shafts. The frame assembly has at least a front portion and a rear portion. The articulation joint connects the front and rear portions and is adapted to allow pivotal movement about the joint by the front and rear portions. The plurality of axles support the frame assembly and include a front axle that supports the front portion. The plurality of ground engaging devices are attached to the axles. The operator compartment is supported by the frame assembly. The body is adapted to carry a load and is connected to the frame assembly. The engine generates torque and is supported by the frame assembly. The transmission is coupled to the engine and receives the torque. The transmission has an output drive coupling for providing the torque. The coupling has a longitudinal axis. The apparatus for receiving the torque from the coupling and transferring the torque to a plurality of drive shafts includes a plurality of gears, an inter-axle differential and a plurality of drive shafts. The inter-axle differential receives the torque and is adapted to provide the torque to more than one of the plurality of gears. The inter-axle differential is drivingly connected substantially along the longitudinal axis to the coupling such that the front axle may be suspended to allow oscillation. The plurality of drive shafts are each connected to at least one of the more than one of the plurality of gears and are adapted to receive a percentage of the torque.

In an embodiment of the present invention an articulated truck for carrying a load through a plurality of work cycles is provided. The articulated truck includes a frame assembly, an articulation joint, a plurality of axles, a plurality of ground engaging devices, an operator compartment, a body, an engine, a transmission and an apparatus for receiving the torque and transferring the torque to a plurality of drive shafts. The frame assembly has at least a front portion and a rear portion. The articulation joint connects the front and rear portions and is adapted to allow pivotal movement about the joint by the front and rear portions. The plurality of axles support the frame assembly. The plurality of axles includes a front axle supporting the front portion. The plurality of ground engaging devices are attached to the axles and are for traversing a grade. The operator compartment is supported by the frame assembly. The body is adapted to carry a load and is connected to the frame assembly. The engine is for generating torque and is supported by the frame assembly. The transmission is coupled to the engine and receives the torque. The transmission has an output drive coupling for providing torque. The coupling has a longitudinal axis. The apparatus for receiving the torque from the coupling and transferring the torque to a plurality of drive shafts includes a plurality of gears, a plurality of drive shafts and an inter-axle differential. The plurality of drive shafts each have a center line, is connected to at least one of the plurality of gears and is adapted to receive a percentage of the torque. The inter-axle differential has a housing having a central plane. The differential receives the torque and provides the torque to more than one of the plurality of gears. The differential is drivingly connected to the coupling and the central plane is located a significantly greater distance from the grade than any of the center lines, such that the front axle may be suspended to allow oscillation.

BRIEF DESCRIPTION OF THE DRAWINGS

For a better understanding of the invention, reference may be made to the accompanying drawings in which.

DETAILED DESCRIPTION

Figure 1:
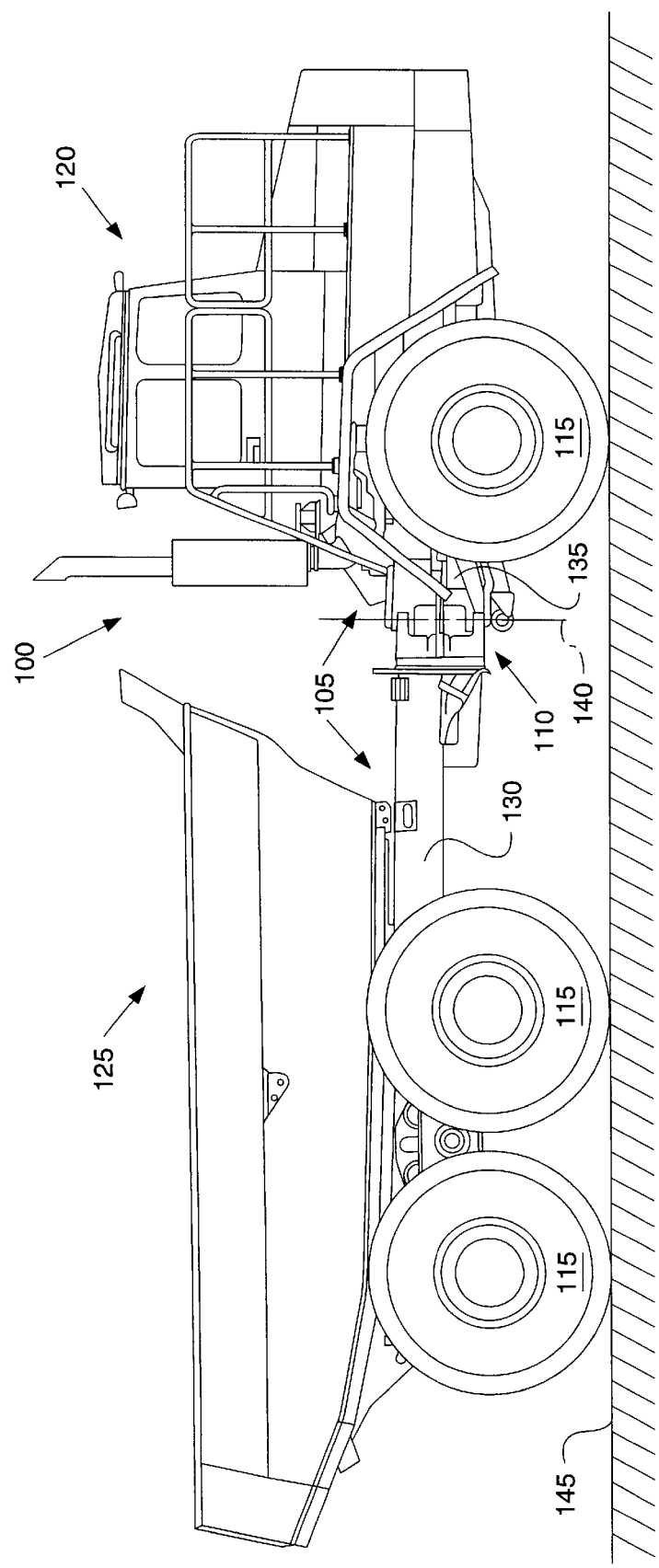
FIG. 1 is a side view of an articulated truck of a preferred embodiment of the present invention.
Figure 2:
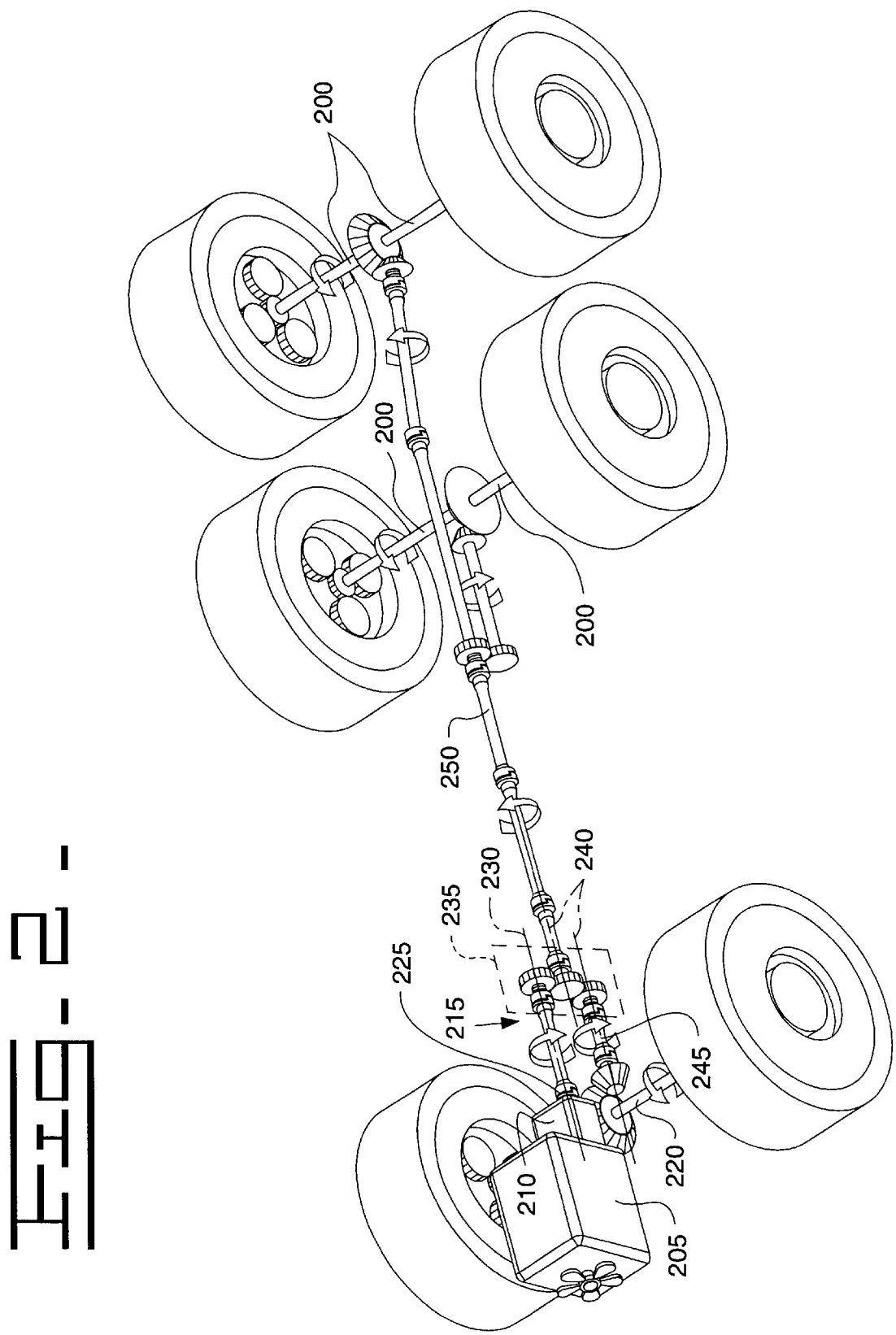
FIG. 2 is a pictogram of a drive train of an articulated truck of a preferred embodiment of the present invention.
Figure 3:
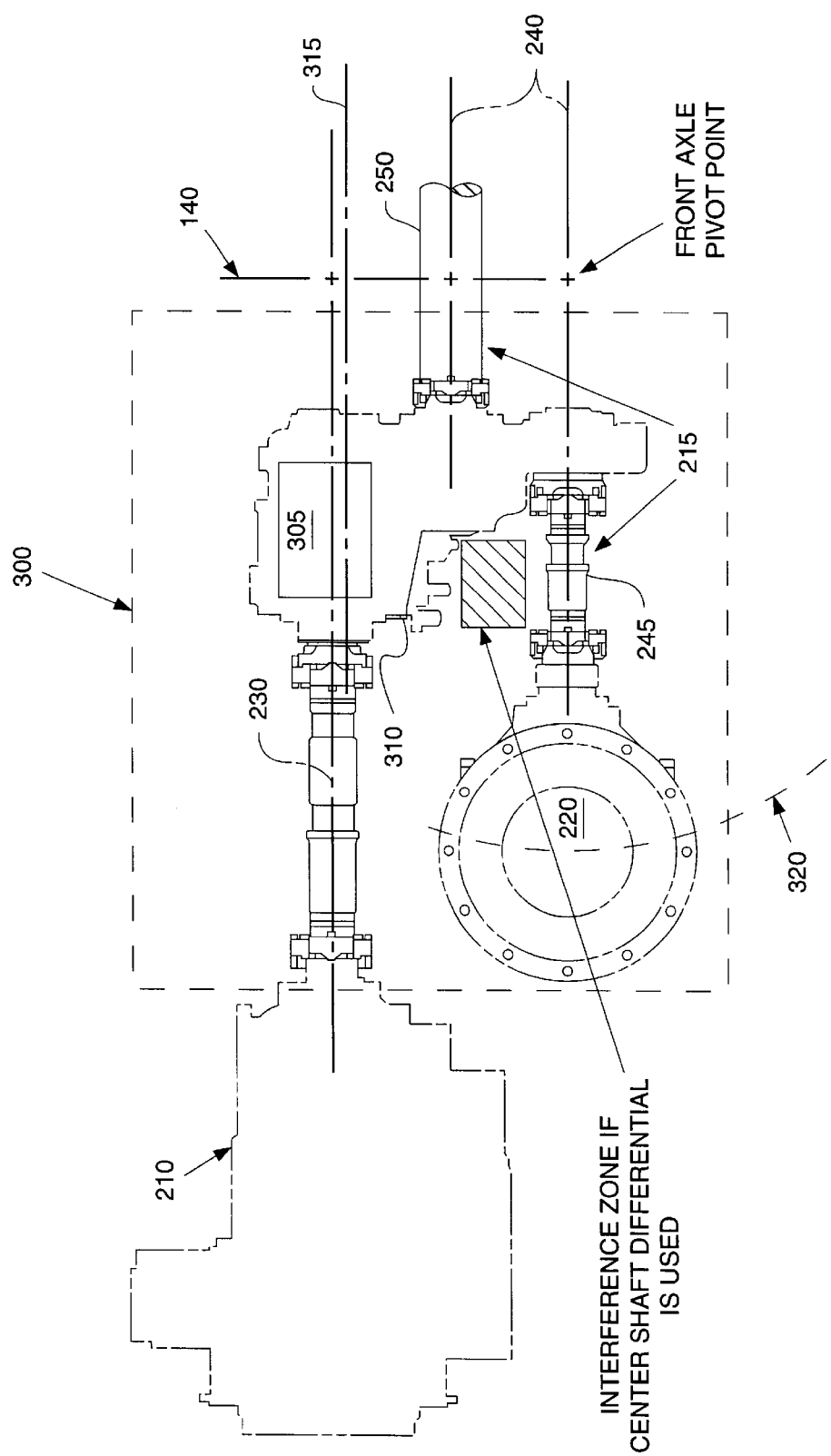
FIG. 3 is a side view of a transmission and an apparatus for receiving the torque from the coupling and transferring the torque to a plurality of drive shafts of the present invention.

A preferred embodiment of the present invention provides an articulated truck 100 for carrying a load through a plurality of work cycles. In FIG. 1, an articulated truck 100 having a frame assembly 105, an articulation joint 110, a plurality of axles 200 (FIG. 2), plurality of ground engaging devices 115, an operator compartment 120, a body 125, an engine 205 (FIG. 2), a transmission 210 (FIG. 2), and an apparatus 300 for receiving the torque and transferring the torque to a plurality of drive shafts 215 (FIG. 2).

The frame assembly 105 preferably has at least a front portion 135 and a rear portion 130. The articulation joint 110 connects the front and rear portions 135, 130 and allows for pivotable movement about the joint 110 by the front and rear portions 135, 130 through articulation axis 140.

The plurality of axles 200 support the frame assembly 105. The plurality of axles 200 includes a front axle 220. The front axle 220 preferably supports front portion 135.

The plurality of ground engaging devices 115 are attached to the axles 200 and are preferably used for traversing a grade 145.

The body 125 is adapted to carry a load and is connected to the frame assembly 105.

The engine 205 generates torque. The engine 205 and the operator compartment 120 are supported by the frame assembly 105.

The transmission 210 is coupled to the engine 205 and receives the torque. Transmission 210 has an output drive coupling 225 for providing the torque. The coupling 225 preferably has a longitudinal axis 230.

The apparatus 300 for receiving the torque from the coupling 225 and transferring the torque to a plurality of drive shafts 215 includes a plurality of gears 235, a plurality of drive shafts 215 and an inter-axle differential 305. The plurality of gears 235 could be any gears readily available and known in the art for use in an output transfer gear box. The plurality of drive shafts 235 are each connected to at least one of the plurality of gears and are adapted to receive a percentage of the torque. Preferably, each of the plurality of drive shafts 215 have a center line 240.

The inter-axle differential 305 receives the torque and provides the torque to more than one of the plurality of gears 235. Preferably, the inter-axle differential 305 has a housing 310 having a central plane 315. The inter-axle differential 305 is drivingly connected to the coupling 225 such that the central plane 315 is located a significantly greater distance from the grade 145 than any of the center lines 240. Preferably, such configuration may provide for the front axle 220 to be suspended to allow oscillation about axle oscillation radius 320.

Advantageously, the inter-axle differential 305 is drivingly connected substantially along longitudinal axis 230 to the coupling 225 such that the front axle 220 may be suspended to allow oscillation about axle oscillation radius 320. In one embodiment, the front axle 220 may be suspended to allow oscillation of up to about 3.9 degrees of deflection from a normal level grade unloaded and stationary position. In another embodiment, the front axle 220 may be suspended to allow oscillation of up to about 3 degrees of deflection from a normal level grade unloaded and stationary position.

In a preferred embodiment, the central plane 315 is located at least 100 millimeters further from the grade 145 than any of the center lines 240 and are advantageously located in the range of about 250 to 360 millimeters further from the grade 145 than any of the center lines 240.

While aspects of the present invention have been particularly shown and described with reference to the preferred embodiment above, it will be understood by those skilled in the art that various additional embodiments may be contemplated without departing from the spirit and scope of the present invention. For example, any of a number of different devices for generating the torque, including an electric motor, could be readily and easily used in place of engine 205 to generate a torque. However, a device or method incorporating such an embodiment should be understood to fall within the scope of the present invention as determined based upon the claims below and any equivalents thereof.

Industrial Applicability

Articulated trucks 100 are commonly used for transporting a loose load, for example, soil, rocks, gravel, garbage and the like from one location to another perform various work cycles. Typically, the articulated truck 100 traverses a grade 145 that is rough terrain or highly varying terrain as these work cycles are performed. This can result in a rough ride for the operator and eventually contribute to operator fatigue. Therefore, it is desirable to provide as smooth a ride to the operator as possible. One factor controlling the quality of the ride is the amount of room for axle oscillation.

By locating the inter-axle differential 305 above the plurality of drive shafts 215 the rear drive shaft 250 may be located a greater distance from the grade 145 than the front drive shaft 245, thereby allowing for a higher mounted hitch or articulation joint 110. This higher mounted articulation joint 110 results in improved machine stability. Additionally, this configuration allows for a longer front drive shaft 245 which accommodates greater vertical displacement of the front axle 220 as the front axle 220 oscillates along axle oscillation radius 320 when traversing rough terrain.

The apparatus of certain embodiments of the present invention, when compared with other apparatus, may have the advantages of: improving space utilization within the chassis of the articulated truck 100; improving stability of the articulated truck 100 by allowing for a higher mounted articulation joint 110; providing room for an oscillated suspended front axle 220; significantly improving the suspension and ride experienced by the operator of the articulated truck 100; and being more economical to manufacture and use. Such advantages are particularly worthy of incorporating into the design, manufacturer, and operation of articulated trucks 100. In addition, the present invention may provide other advantages that have not been discovered yet.

It should be understood that while a preferred embodiment is described in connection with an articulated dump truck 100, the present invention is readily adaptable to provide similar functions for other work machines. Other aspects, objects, and advantages of the present invention can be obtained from a study of the drawings, the disclosure, and the appending claims.

What is claimed is:

1. An articulated truck for carrying a load through a plurality of work cycles, comprising:

a frame assembly having at least a front portion and a rear portion;

an articulation joint connecting the front and rear portions and adapted to allow pivotal movement about the joint by the front and rear portions;

a plurality of axles supporting the frame assembly, including a front axle supporting the front portion;

a plurality of ground engaging devices attached to the axles;

an operator compartment supported by the frame assembly;

a body adapted to carry a load and being connected to the frame assembly;

an engine for generating torque and being supported by the frame assembly;

a transmission coupled to the engine for receiving the torque and having a transmission output drive coupling for providing the torque, the coupling having a longitudinal axis; and an apparatus for receiving the torque from the coupling and transferring the torque to a plurality of drive shafts, including:
- a plurality of gears;
- an inter-axle differential for receiving the torque and adapted to provide the torque to more than one of the plurality of gears and being drivingly connected substantially along the longitudinal axis to the coupling; and
- a plurality a plurality of drive shafts each connected to at least one of the more than one of the plurality of gears and adapted to receive a percentage of the torque.

2. The articulated truck of claim 1, wherein the front axle is suspended to allow oscillation of up to about 3.9 degrees of deflection from a normal level-grade unloaded and stationary position.

3. The articulated truck of claim 1, wherein the front axle is suspended to allow oscillation of up to about 3 degrees of deflection from a normal level-grade unloaded and stationary position.

4. The articulated truck of claim 1, wherein the front axle is suspended to allow oscillation.

5. The articulated truck of claim 4, wherein the front axle is suspended from the inter-axle differential to allow oscillation in a plane substantially perpendicular to grade.

6. The articulated truck of claim 4, wherein the front axle is suspended from the inter-axle differential to allow oscillation about an axle oscillation radius relative to the inter-axle differential.

7. An articulated truck for carrying a load through a plurality of work cycles, comprising:
- a frame assembly having at least a front portion and a rear portion;
- an articulation joint connecting the front and rear portions and adapted to allow pivotal movement about the joint by the front and rear portions;
- a plurality of axles supporting the frame assembly, including a front axle supporting the front portion;
- a plurality of ground engaging devices attached to the axles and for traversing a grade;
- an operator compartment supported by the frame assembly;
- a body adapted to carry a load and being connected to the frame assembly;
- an engine for generating torque and being supported by the frame assembly;
- a transmission coupled to the engine for receiving the torque and having a transmission output drive coupling for providing the torque, the coupling having a longitudinal axis; and
- an apparatus for receiving the torque from the coupling and transferring the torque to a plurality of drive shafts, including:
  - a plurality of gears;
  - a plurality of drive shafts each having a center line, connected to at least one of the plurality of gears and adapted to receive a percentage of the torque; and
  - an inter-axle differential configured to receive the torque and adapted to provide the torque to more than one of the plurality of gears, the inter-axle differential being drivingly connected to the coupling and located a significantly greater distance from the grade than any of the center lines.

8. The articulated truck of claim 7, wherein the inter-axle differential includes a housing having a central plane, the central plane being located a significantly greater distance from the grade than any of the center lines.

9. The articulated truck of claim 8, wherein the central plane is located at least 100 millimeters further from the grade than any of the center lines.

10. The articulated truck of claim 8, wherein the central plane is located at least about 250 millimeters further from the grade than any of the center lines.

11. The articulated truck of claim 8, wherein the central plane is located in the range of about 250 to 360 millimeters further from the grade than any of the center lines.

12. The articulated truck of claim 7, wherein the front axle is suspended to allow oscillation.

13. The articulated truck of claim 12, wherein the front axle is suspended from the inter-axle differential to allow oscillation in a plane substantially perpendicular to grade.

14. The articulated truck of claim 12, wherein the front axle is suspended from the inter-axle differential to allow oscillation about an axle oscillation radius relative to the inter-axle differential.

15. An articulated truck-for carrying a load through a plurality of work cycles, comprising:
- a frame assembly having at least a front portion and a rear portion;
- an articulation joint connecting the front and rear portions and configured to allow pivotal movement about the joint by the front and rear portions;
- supporting the a plurality of axles supporting the frame assembly, including a front axle supporting the front portion;
- a plurality of ground engaging devices attached to the plurality of axles;
- an engine for generating torque and being supported by the frame assembly;
- a transmission coupled to the engine, the transmission being configured to receive torque from the engine, the transmission having a transmission output drive coupling for providing a torque output, the drive coupling having a longitudinal axis;
- an apparatus configured to receive the torque output from the drive coupling and to transfer the torque output to a plurality of drive shafts, the apparatus including:
  - a plurality of gears, and
    - an inter-axle differential configured to receive the torque output and to provide torque to more than one of the plurality of gears, the inter-axle differential being drivingly connected substantially along the longitudinal axis to the drive coupling; and
  - a plurality of drive shafts each connected to at least one of the more than one of the plurality of gears and configured to receive a percentage of the torque from the inter-axle differential.

16. The articulated truck of claim 15, wherein the inter-axle differential includes a housing having a central plane and a plurality of drive shafts each includes a center line, the central plane being located a significantly greater distance from grade than any of the center lines.

17. The articulated truck of claim 15, wherein the front axle is suspended to allow oscillation.

18. The articulated truck of claim 17, wherein the front axle is suspended from the inter-axle differential to allow oscillation in a plane substantially perpendicular to grade.

19. The articulated truck of claim 17, wherein the front axle is suspended from the inter-axle differential to allow oscillation about an axle oscillation radius relative to the inter-axle differential.

* * * * *

UNITED STATES PATENT AND TRADEMARK OFFICE
CERTIFICATE OF CORRECTION

PATENT NO.   : 6,631,773 B1
DATED        : October 14, 2003
INVENTOR(S)  : Richard D. Walker It is certified that error appears in the above-identified patent and that said Letters Patent is hereby corrected as shown below:

<u>Column 6,</u>
Line 27, "supporting the" should be deleted.

Signed and Sealed this

Twentieth Day of January, 2004

JON W. DUDAS
*Acting Director of the United States Patent and Trademark Office*